Patented Aug. 16, 1938

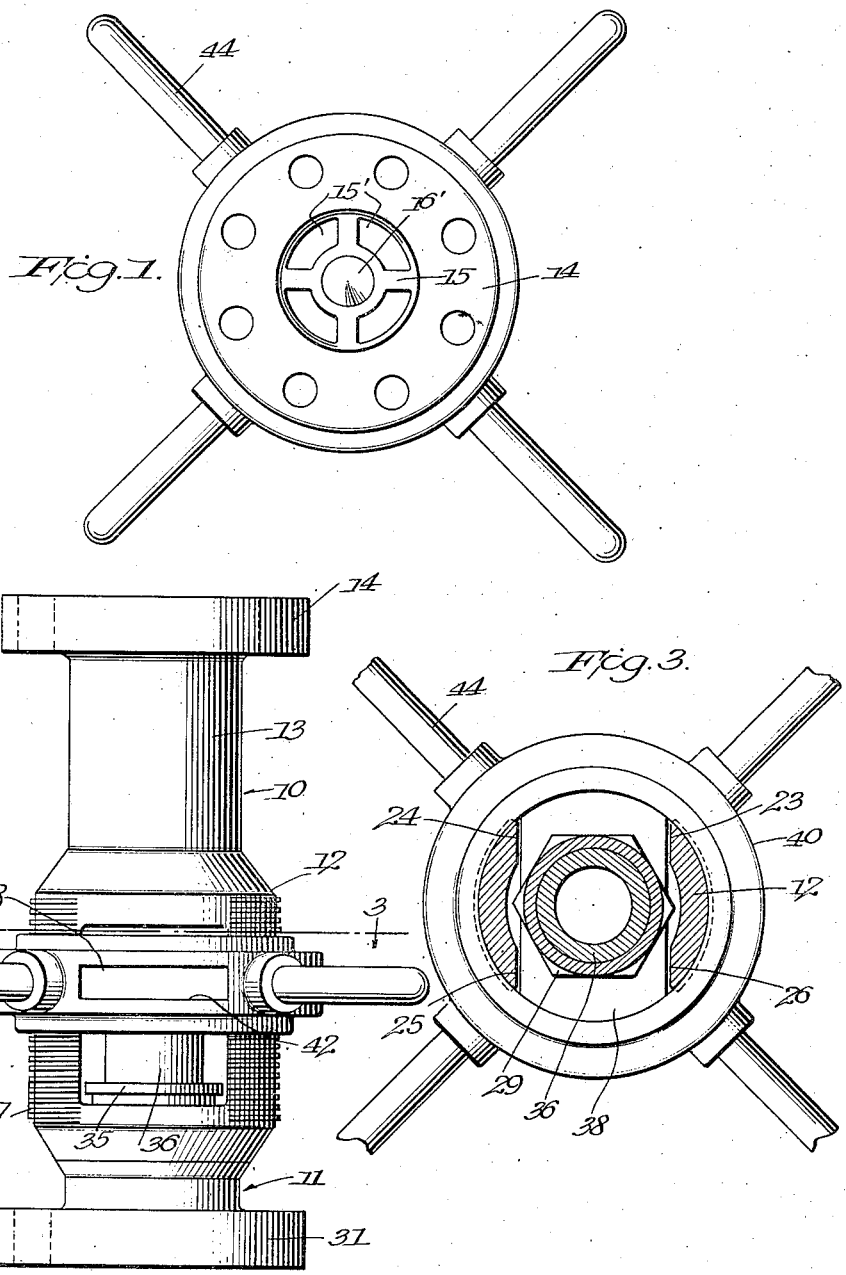

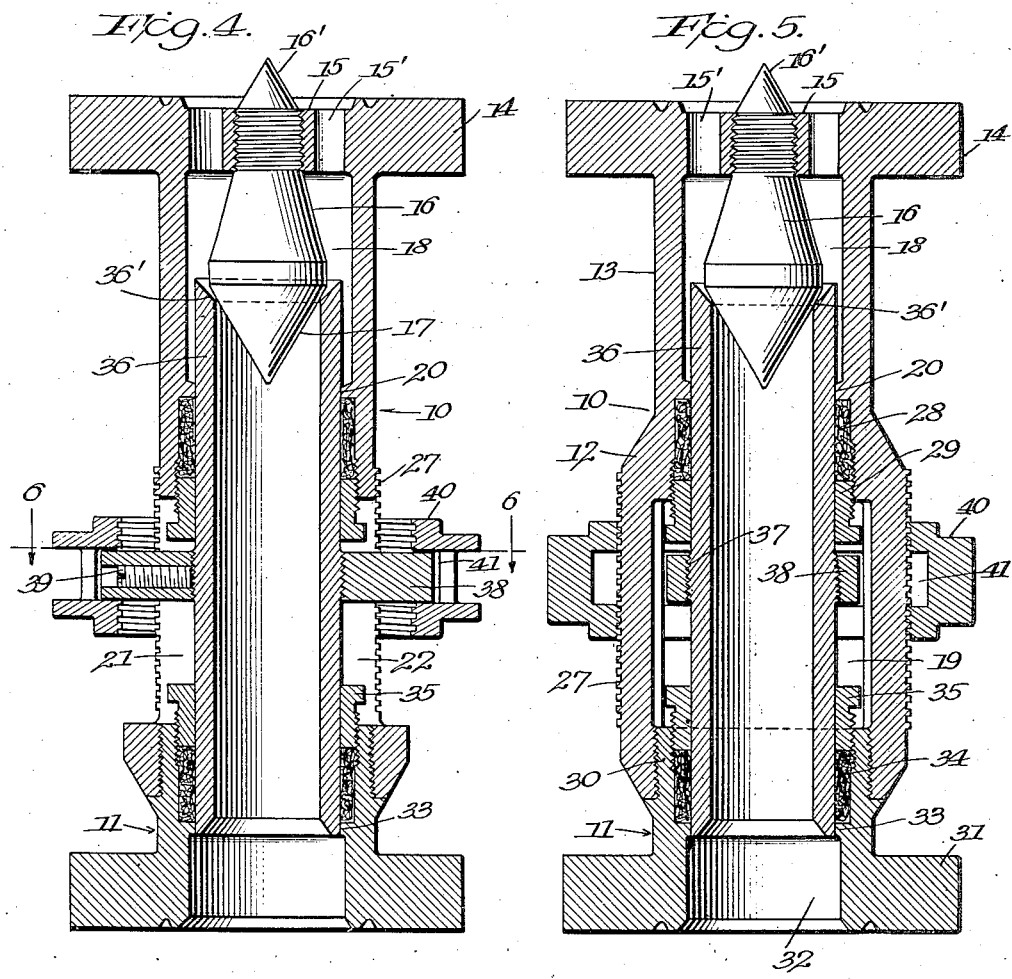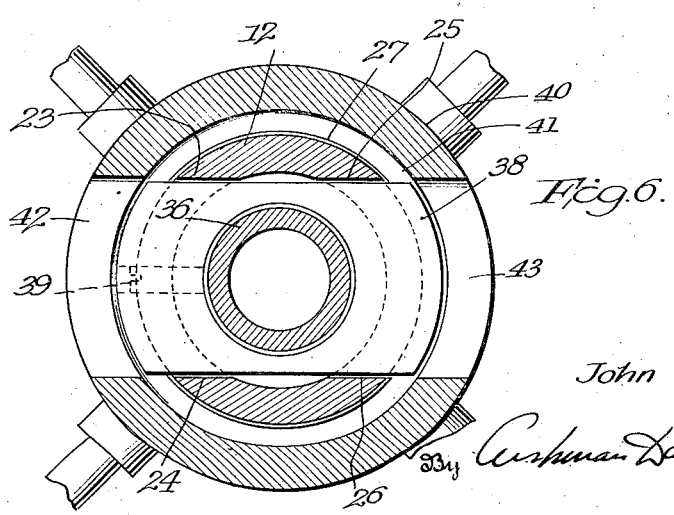

2,126,856

UNITED STATES PATENT OFFICE 2,126,856

STRAIGHT LINE NEEDLE VALVE

John R. Yancey, Houston, Tex., assignor to Gray Tool Company, Houston, Tex., a corporation of Texas Application August 24, 1936, Serial No. 97,699
Renewed April 20, 1938

8 Claims. (Cl. 251—8)

The present invention relates to valves and particularly to choke valves designed to control the flow lines in oil well installations. A principal object of the invention is to provide a valve which has a straight line controllable flow passage therethrough and this and other objects are attained in the illustrative embodiment of the invention shown in the accompanying drawings, with reference to which the principles of the invention will be explained.

In the drawings:

Figure 1 is a plan view of the new valve.

Figure 2 is an elevation.

Figure 3 is a section substantially on the line 3—3 of Figure 2.

Figure 4 is an axial section of the valve.

Figure 5 is an axial section of the valve in a plane at right angles to the section of Figure 4, and Figure 6 is a section substantially on the line 6—6 of Figure 4.

Referring to the drawings, reference numeral 10 designates generally the main portion of a valve body and reference numeral 11 a cap piece. The part 10 comprises a cylindrical portion 12 which merges into a reduced cylindrical portion 13, the latter terminating in a radially expanded attachment flange 14 which may be provided with holes for the reception of coupling bolts. Portion 13 has, as here shown, an integral spider 15 therein at its flanged end, the spider defining the flow openings 15' and having a central threaded bore in which is threaded the stem of a needle 16 which presents an inwardly directed conical end 17 disposed within a cylindrical passage 18 within the body portion 13. To facilitate flow, the stem may be continued past the spider and pointed, as shown at 16'.

The passage 18 is continued into an enlarged aligned cylindrical passage 19 within body portion 12, the two passages as here shown being separated by an annular rib 20. The portion 12 is provided with diametrically opposite longitudinally extending openings 21 and 22 which have parallel rectilinear edges 23, 24 and 25, 26, respectively. Also portion 12 is provided externally with threads 27, these being interrupted by the openings 21 and 22. In a counter bore at the inner end of passage 19, is disposed a packing 28 and a gland nut 29, the nut being threaded in the counter bore and being insertable to position through the enlarged passage 19.

The outer end of body portion 12 is internally threaded and has engaged therein the shank 30 of cap 11 which latter includes an attachment flange 31 similar to flange 14. Cap 11 has a cylindrical passage 32 in alignment with passage 19 and separated from a counter bore by an annular rib 33 having the same internal diameter as rib 20, the counter bore receiving a packing 34 and having threaded in its end a gland nut 35.

Reciprocably guided by the ribs 20 and 33 of the parts 10 and 11 is a cylindrical tube 36 which constitutes a flow passage proper since flow through the valve is confined to tube 36 as to that part of the passage 18, 19 which is occupied by the tube, leakage around the tube being prevented by the packings 28 and 34. Medially tube 36 is provided with projecting external threads 37. A plate 38 in the nature of a cross-head has a central threaded opening engaged with the threads 37 and is fixed to tube 36 by a set screw 39. The cross-head has opposite ends which project through openings 21 and 22, the curve of the ends being concentric with the valve body. The cross-head has parallel lateral edges which are in guided relation to the edges 23 to 26 of openings 21 and 22.

A nut 40 is engaged with threads 27 and has an internal annular groove 41 in which the projecting ends of the cross-head 38 are received. In the plane of groove 41 nut 40 has diametrically opposite slots 42 and 43 which have substantially the same width as openings 21 and 22. As here shown nut 40 has four radially projecting handles 44 secured thereto.

It will be evident that rotation of nut 40 will cause it to travel longitudinally of the valve body and in view of its engagement with the ends of the cross-head the latter and therewith tube 36 will be caused to participate in the travel. Rotation of tube 36 and cross-head 38 is prevented due to the engagement of the latter with the edges of openings 21 and 22. In this manner the relation of the tube to the conical surface 17 of needle 16 is subject to adjustment for the purpose of controlling flow through the valve. The tube is movable from the position of Figures 4 and 5, wherein flow is entirely cut off because of the full peripheral engagement of the needle with the seat portion 36' of the tube, to a position wherein its top edge is about flush with the top of rib 20, wherein maximum flow is permitted. In all flow positions a substantially straight line flow condition exists, and flow may be in either direction.

In assembly, the needle 16 is first screwed to position in the spider 15 whereupon packing 28 is inserted in the counter bore and gland nut 29 is applied. Nut 40 is now screwed on the body portion 12 and its slots 42, 43 are aligned with openings 21, 22 of the body portion 12, whereupon the plate or cross-head 38 may be inserted to the position particularly shown in Figure 4. The sleeve 36 may now be inserted through the cross-head and gland and turned so as to engage its threads with the threaded opening in the cross-head. When the position shown in Figures 4 and 5 is reached the set screw 39 is tightened so as to hold the tube and cross-head against relative rotation. The cap 11, with the gland applied, may now be screwed in the open end of body portion 12 and the gland nuts may be further tightened if necessary. The valve is now ready for use.

In the usual oil well installation the flow line is led out horizontally from the well head and has interposed therein a choke. The choke ordinarily has a flow passage with a right angle bend which means that the line of flow is unnecessarily and inconveniently changed and, moreover, the choke is subjected to severe wear at the bend. These objectionable features are eliminated by the use of the straight line choke herein disclosed.

The present disclosure is intended to be merely illustrative of the invention and I do not limit myself except as in the following claims.

I claim:

1. A valve comprising a body having a straight line flow passage, a tube of less length than said passage reciprocable therein, flow through said passage being confined to said tube as to that part of the passage occupied by the tube, a needle in said passage at one end of said tube and with which said tube cooperates for the purpose of flow control, said body having opposite side openings between the ends of said tube and being provided with external threads interrupted by said openings, a nut engaged with said threads and a cross-head releasably secured to said tube and projecting through said openings, said nut having an internal annular groove receiving the ends of said cross-head so that the tube is caused to follow the travel of the nut, the nut having a radial slot through which the cross-head is insertable to position.

2. A valve comprising a body having a straight line flow passage, a tube of less length than said passage reciprocable therein, flow through said passage being confined to said tube as to that part of the passage occupied by the tube, a needle in said passage at one end of said tube and with which said tube cooperates for the purpose of flow control, said body having opposite side openings between the ends of said tube and being provided with external threads interrupted by said openings, a nut engaged with said threads, a cross-head having a central opening in which said tube is received and releasably secured, said cross-head having portions projecting through said openings and engaged with said nut so that said tube is caused to travel with said nut.

3. A valve comprising a body having a straight line flow passage, a tube of less length than said passage reciprocable therein, flow through said passage being confined to said tube as to that part of the passage occupied by the tube, a needle in said passage at one end of said tube and with which said tube cooperates for the purpose of flow control, said body having opposite side openings between the ends of said tube and being provided with external threads interrupted by said openings, a nut engaged with said threads, a cross-head having a central opening in which said tube is received and releasably secured, said cross-head having portions projecting through said openings, said nut having an internal annular groove receiving the ends of said cross-head so that the tube is caused to follow the travel of the nut.

4. A valve comprising a body having a straight line flow passage, a tube of less length than said passage reciprocable therein, flow through said passage being confined to said tube as to that part of the passage occupied by the tube, a needle in said passage at one end of said tube and with which said tube cooperates for the purpose of flow control, said body having opposite side openings between the ends of said tube and being provided with external threads interrupted by said openings, a nut engaged with said threads, a cross-head having a central opening in which said tube is received and releasably secured, said cross-head having portions projecting through said openings, said nut having an internal annular groove receiving the ends of said cross-head so that the tube is caused to follow the travel of the nut, the nut having a radial slot through which the cross-head is insertable to position.

5. A valve comprising a body element having a flanged end and a cylindrical passage comprising a portion adjacent said end and an enlarged continuing portion in the other end of said body and in alignment with the first portion, a packing at the inner end of said enlarged portion, said packing including a gland nut inserted to position through said enlarged portion, a cap secured to the end of said body remote from said flanged end, said cap having a passage of the same size as the body passage adjacent said flanged end and said cap carrying a packing including a gland nut, a reciprocable tube having its end portions slidably received in said packings, a needle secured in fixed relation to said body at one end of said tube and with which the latter cooperates for the purpose of flow control, and means for reciprocating said tube.

6. Structure according to claim 5 wherein the means for reciprocating the tube includes a nut threaded on the outside of said body in the zone of said enlarged passage portion.

7. Structure according to claim 5 wherein the body is provided with a side opening in the zone of said enlarged passage portion, and wherein the means for reciprocating the tube includes a nut threaded on said body and means secured to said tube and projecting through said opening and engaged by said nut.

8. Structure according to claim 5 wherein the body is provided with opposite side openings in the zone of said enlarged passage portion; and wherein the means for reciprocating the tube includes a cross-head secured to said tube and projecting through said openings, and a nut threaded on said body and having an internal annular recess in which the projecting portions of said cross-head are engaged.

JOHN R. YANCEY.